(12) United States Patent
Zhu et al.

(10) Patent No.: US 10,891,799 B2
(45) Date of Patent: Jan. 12, 2021

(54) AUGMENTED REALITY PROCESSING METHOD, OBJECT RECOGNITION METHOD, AND RELATED DEVICE

(71) Applicant: TENCENT TECHNOLOGY (SHENZHEN) COMPANY LIMITED, Shenzhen (CN)

(72) Inventors: Xiaolong Zhu, Shenzhen (CN); Yitong Wang, Shenzhen (CN); Kaining Huang, Shenzhen (CN); Lijian Mei, Shenzhen (CN); Shenghui Huang, Shenzhen (CN); Jingmin Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/680,058

(22) Filed: Nov. 11, 2019

(65) Prior Publication Data
US 2020/0082635 A1 Mar. 12, 2020

Related U.S. Application Data

(63) Continuation of application No. PCT/CN2018/120301, filed on Dec. 11, 2018.

(30) Foreign Application Priority Data

Dec. 13, 2017 (CN) .......................... 2017 1 1329984

(51) Int. Cl.
*G06T 19/00* (2011.01)
*G06T 7/55* (2017.01)
(Continued)

(52) U.S. Cl.
CPC .......... *G06T 19/006* (2013.01); *G06K 9/6256* (2013.01); *G06N 3/08* (2013.01);
(Continued)

(58) Field of Classification Search
CPC ......... G06T 19/006; G06T 7/55; G06T 7/248; G06T 2207/10016; G06T 2207/20084;
(Continued)

(56) References Cited

U.S. PATENT DOCUMENTS

| 2016/0063330 A1* | 3/2016 | Xu ............................ B60R 1/00 |
| | | 382/103 |
| 2019/0094981 A1* | 3/2019 | Bradski .............. G02B 27/0093 |
| 2020/0082635 A1* | 3/2020 | Zhu .......................... G06T 7/55 |

FOREIGN PATENT DOCUMENTS

| CN | 103093212 A | 5/2013 |
| CN | 104992452 A | 10/2015 |

(Continued)

OTHER PUBLICATIONS

The World Intellectual Property Organization (WIPO), International Search Report for PCT/CN2018/120301, dated Mar. 12, 2019, 6 Pages (including translation).
(Continued)

*Primary Examiner* — Todd Buttram
(74) *Attorney, Agent, or Firm* — Anova Law Group, PLLC

(57) ABSTRACT

An augmented reality processing method is provided for a terminal. The method includes: obtaining a plurality of frames of images, comprising a first image and a second image, which is a frame of an image immediately following the first image; obtaining a key point set of a first object in the first image; obtaining, through a neural network model, first pose key point sets respectively corresponding to a plurality of objects in the second image; determining a
(Continued)

second pose key point set of the first object in the second image according to the key point set and a motion trend of the first object; using a target first pose key point set as a key point set of the first object in the second image; and generating an augmented information image according to the key point set of the first object in the second image.

17 Claims, 7 Drawing Sheets

(51) Int. Cl.
    *G06T 7/246*     (2017.01)
    *G06K 9/62*     (2006.01)
    *G06N 3/08*     (2006.01)

(52) U.S. Cl.
    CPC ............... *G06T 7/248* (2017.01); *G06T 7/55* (2017.01); *G06T 2207/10016* (2013.01); *G06T 2207/20084* (2013.01)

(58) Field of Classification Search
    CPC .......... G06T 19/00; G06T 17/00; G06T 7/00; G06T 2215/16; G06N 3/08; G06K 9/6256; G06K 9/00664–00704; G06F 2111/18; G06F 3/0481; G06F 3/04817; G06F 9/4443; G06F 3/04847; G06F 11/3664; G06F 3/012; G06F 3/0304; G06F 3/011–015; H04N 5/272; H04N 2201/3245; A63F 13/10
    See application file for complete search history.

(56) References Cited

FOREIGN PATENT DOCUMENTS

| | | |
|---|---|---|
| CN | 105975119 A | 9/2016 |
| CN | 106845385 A | 6/2017 |
| CN | 107038713 A | 8/2017 |
| JP | 2017138659 A | 8/2017 |

OTHER PUBLICATIONS

Cao Zhe et al. "Realtime Multi-Person 2D Pose Estimation using Part Affinity Fields", The IEEE Conference on Computer Vision and Pattern Recognition (CVPR), 2017, pp. 7291-7299, 9 Pages.

Shih-En Wei et al. "Convolutional Pose Machines", Proceedings of the IEEE Conference on Computer Vision and Pattern Recognition. 2016: 4724-4732. 9 Pages.

Jean-Yves Bouguet, Pyramidal implementation of the affine lucas kanade feature tracker description of the algorithm. Intel Corporation, Microprocessor Research Labs, 2001, 10 Pages.

Paul Zarchan et al., "Fundamentals of Kalman Filtering: A Practical Approach. American Institute of Aeronautics and Astronautics", Incorporated. ISBN 978-1-56347-455-2. 67 Pages.

\* cited by examiner

AUGMENTED REALITY PROCESSING METHOD, OBJECT RECOGNITION METHOD, AND RELATED DEVICE

RELATED APPLICATIONS

This application is a continuation application of PCT Patent Application No. PCT/CN2018/120301, filed on Dec. 11, 2018, which claims priority to Chinese Patent Application No. 201711329984.8, entitled "AUGMENTED REALITY PROCESSING METHOD, OBJECT RECOGNITION METHOD, AND TERMINAL" filed with the Chinese Patent Office on Dec. 13, 2017, which is incorporated by reference in its entirety.

FIELD OF THE TECHNOLOGY

The present disclosure relates to the field of computer vision and, in particular, to an augmented reality processing method and an object recognition method.

BACKGROUND

With development of Internet technologies, video social networking also gradually becomes a communication method loved by people. Instant social networking application programs have high user permeation rate and, to increase the fun of social networking, are also able to set up different scenes or video environments by recognizing pose information of different users.

Currently, user pose information can be recognized based on a neural network model. For example, a "bottom up" method can be applied, using the neural network model to predict a probability heat map and a vector or PAF (part affinity fields) heat map corresponding to all pose key points in an image and, then, all the pose key points are connected by using a post-processing algorithm to form a pose of each person.

However, in an existing pose recognition algorithm, poses of all persons in each frame of image are recognized, but poses of a particular person in a video sequence cannot be connected in series. In other words, in a case that multi-person interaction in a video stream is processed, whether a specific piece of pose information in a current frame of image and a specific piece of pose information in another frame of image belong to a same person often cannot be determined by using the existing pose recognition algorithm. Consequently, accuracy of recognition is reduced.

The disclosed methods and systems are directed to solve one or more problems set forth above and other problems.

SUMMARY

Embodiments of the present invention provide an augmented reality processing method, an object recognition method, and a related device, so that in a multi-person interaction scene, a terminal can recognize key point sets that belong to a same object in a video stream, so that accuracy of recognition is improved.

One aspect of the present disclosure includes an augmented reality processing method for a terminal. The method includes obtaining a plurality of frames of images, the plurality of frames of images comprising a first image and a second image, the second image being a frame of an image immediately following the first image; obtaining a key point set of a first object in the first image. The method also includes obtaining, through a neural network model, first pose key point sets respectively corresponding to a plurality of objects in the second image, the neural network model being configured to obtain a key point set of an object in an image, and the first pose key point set comprising at least one first pose key point. The method also includes determining a second pose key point set of the first object in the second image according to the key point set and a motion trend of the first object, the second pose key point set comprising at least one second pose key point; determining, for any target first pose key point set in the plurality of first pose key point sets, a target distance between the target first pose key point set and the second pose key point set according to at least one first pose key point in the target first pose key point set and the at least one second pose key point; using the target first pose key point set as a key point set of the first object in the second image when the target distance is less than a preset threshold; and generating an augmented information image according to the key point set of the first object in the second image.

Another aspect of the present disclosure includes an object recognition method for a terminal. The method includes obtaining a plurality of frames of images, the plurality of frames of images comprising a first image and a second image, the second image being a frame of an image immediately following the first image. The method also includes obtaining a key point set of the first object in the first image; obtaining, through a neural network model, first pose key point sets respectively corresponding to a plurality of objects in the second image, the neural network model being configured to obtain a key point set of an object in an image, and the first pose key point set comprising at least one first pose key point. The method also includes determining a second pose key point set of the first object in the second image according to the key point set and a motion trend of the first object, the second pose key point set comprising at least one second pose key point; for any target first pose key point set in the plurality of first pose key point sets, determining a target distance between the target first pose key point set and the second pose key point set according to at least one first pose key point in the target first pose key point set and the at least one second pose key point; and using the target first pose key point set as a key point set of the first object in the second image when the target distance satisfies a preset condition.

Another aspect of the present disclosure includes a terminal. The terminal includes a memory configured to store a program; a processor; and a bus system configured to connect the memory and the processor, to enable the memory and the processor to communicate with each other. The processor is configured to execute the program in the memory to perform: obtaining a plurality of frames of images, the plurality of frames of images comprising a first image and a second image, the second image being a frame of an image immediately following the first image; obtaining a key point set of a first object in the first image; obtaining, through a neural network model, first pose key point sets respectively corresponding to a plurality of objects in the second image, the neural network model being configured to obtain a key point set of an object in an image, and the first pose key point set comprising at least one first pose key point; determining a second pose key point set of the first object in the second image according to the key point set and a motion trend of the first object, the second pose key point set comprising at least one second pose key point; determining, for any target first pose key point set in the plurality of first pose key point sets, a target distance between the target first pose key point set and the second pose key point set according to at least one first pose key point in the target first pose key point set and the at least one second pose key point; using the target first pose key point set as a key point set of the first object in the second image when the target distance satisfies a preset condition; and generating an augmented information image according to the key point set of the first object in the second image.

Other aspects of the present disclosure can be understood by those skilled in the art in light of the description, the claims, and the drawings of the present disclosure.

DETAILED DESCRIPTION

Embodiments of the present disclosure provide an augmented reality processing method, an object recognition method, and a related device, so that in a multi-person interaction scene, a terminal can recognize key point sets that belong to a same object in a video stream, thus the recognition accuracy is improved.

The following describes the technical solutions in the embodiments of the present disclosure with reference to the accompanying drawings. Apparently, the described embodiments are some embodiments of the present disclosure rather than all of the embodiments.

In the specification, claims, and accompanying drawings of the present disclosure, the terms "first", "second", "third", "fourth", and so on (in a case of existence) are intended to distinguish between similar objects but do not necessarily indicate a specific order or sequence. It should be understood that data used in this way can be interchanged in an appropriate case, so that the embodiments of the present disclosure that are described herein, for example, can be implemented in a sequence other than those sequences illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

It should be understood that, the present disclosure is mainly applied to the field of computer vision and, specifically, to human body pose recognition. The human body pose recognition technology can help a computer understand an action, a pose, and a behavior of a user, and is a basis of a plurality of human body pose applications. Currently, the human body pose recognition technology is adopted in a relatively large number of social application programs. For example, when a user takes a selfie, positions of five sense organs of the user may be recognized for covering corresponding stickers on them, or in a live streaming process of a user, a pop-up screen may appear above the head of the user. However, in the present disclosure, a same person can be recognized in scenes including a plurality of persons.

Figure 1:
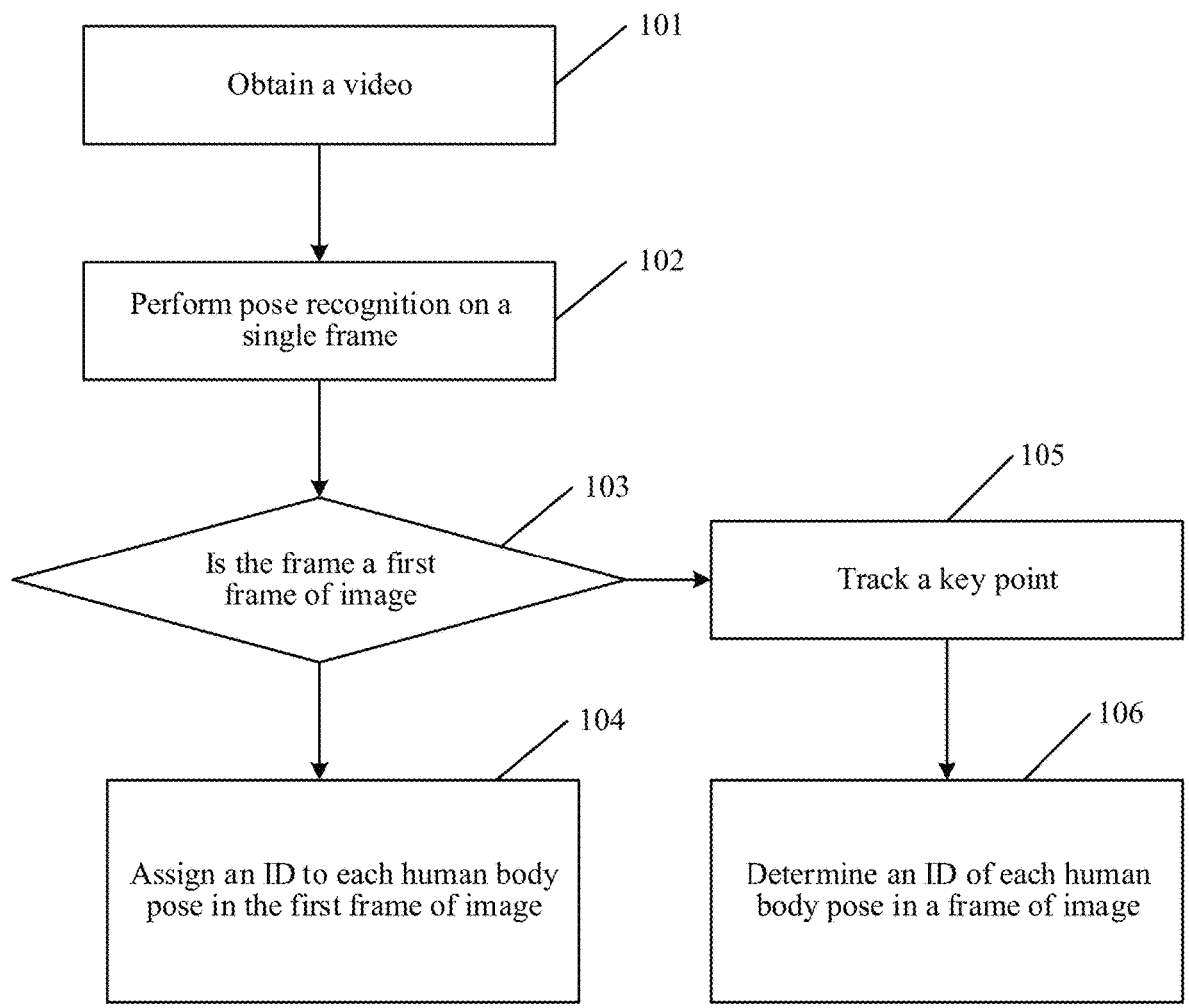
FIG. 1 is a flowchart of multi-person interaction pose recognition according to an embodiment of the present disclosure.

FIG. 1 is a flowchart of multi-person interaction pose recognition according to an embodiment of the present disclosure. As shown in the figure, the recognition may include the followings.

Step 101: Obtain a video, where the video includes a plurality of frames of images.

Step 102: Perform human body pose estimation on each frame of image in the video.

Step 103: Determine whether the frame of image in step 102 is a first frame of image in the video, and when the frame of image in step 102 is the first frame of image in the video, perform step 104; otherwise, when the frame of image in step 102 is not the first frame of image in the video, perform step 105.

Step 104: Assign a unique identity (ID) to each human body pose in the first frame of image.

Step 105: Continue performing human body pose estimation on the frame of image, and track human body pose key points in a previous frame of image when the frame of image in step 102 is not the first frame of image in the video.

Step 106: Combining the key-point tracking result and the pose estimation result of a current frame of image, determine an ID of each human body pose of the current frame of image.

Figure 2:
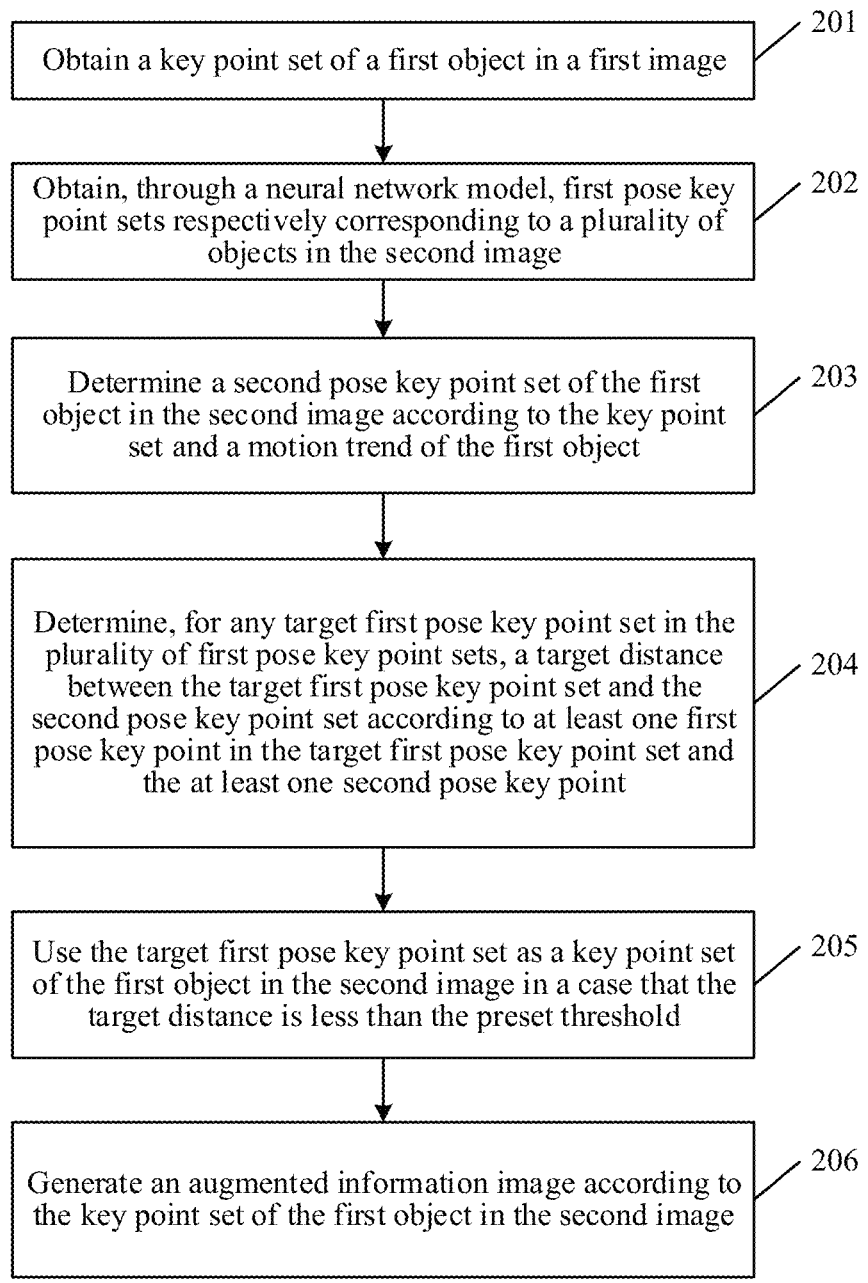
FIG. 2 is a schematic diagram of an augmented reality processing method according to an embodiment of the present disclosure.

The augmented reality processing method in the present disclosure is described below from the perspective of a terminal. FIG. 2 illustrates an augmented reality processing method according to an embodiment of the present disclosure. As shown in FIG. 2, the method includes the followings.

201: Obtain a key-point set of a first object in a first image.

In one embodiment, the method is applied to the terminal, the terminal is configured to generate an augmented information image for a first object in a plurality of frames of images, the plurality of frames of images includes a first image and a second image, and the second image is a frame of an image immediately following the first image.

Specifically, the first object may be a user in the first image, the augmented information image may be a sticker, such as "clothing", an "airplane", or a "flower", and the first object and the augmented information image may be combined into one object by using the augmented reality (AR) technology.

202: Obtain, through a neural network model, first pose key point sets respectively corresponding to a plurality of objects in the second image, the neural network model being configured to obtain a key point set of an object in an image, and the first pose key point set including at least one first pose key point.

In one embodiment, the terminal obtains, by using a neural network model, first pose key point sets respectively corresponding to a plurality of objects in the second image. In this case, the second image may be used as input of the neural network model, and the first pose key point sets respectively corresponding to the plurality of objects are used as output of the neural network model. The neural network model herein may be specifically OpenPose, and in addition, may be a convolutional neural network-based pose estimation algorithm (convolutional pose machines, CPM). The second image is inputted into the neural network model, so that the first pose key point sets respectively corresponding to the plurality of objects in the second image may be outputted, where the first pose key point set includes at least one first pose key point.

203: Determine a second pose key point set of the first object in the second image according to the key point set and a motion trend of the first object, the second pose key point set including at least one second pose key point. In one embodiment, the terminal predicts the key point set in the first image by using at least one of an optical flow algorithm, a Kalman filter algorithm, and a sliding window algorithm, so as to obtain a second pose key point set of the first object in the second image.

It is required that the second pose key point set can reflect a possible pose of the first object in a next frame of image (the second image), and the motion trend can reflect a possible pose of the first object in the next frame. Therefore, a principle of predicting the second pose key point set of the first object in the second image is actually performing prediction according to the key point set obtained in step 201 and the motion trend of the first object, so as to ensure that the second pose key point corresponds to the first object, and reflects the possible pose of the first object in the second image.

It should be noted that according to different algorithms used, the motion trend of the first object may possibly be determined in different manners. A manner of determining the motion trend of the first object may be determining the motion trend of the first object according to the first image. In this case, the used algorithm may be the Kalman filter algorithm or the sliding window algorithm.

Another manner of determining the motion trend of the first object may be determining the motion trend of the first object according to a pixel change between the first image and the second image. In this case, the used algorithm may be the optical flow algorithm.

204: Determine, for any target first pose key point set in the plurality of first pose key point sets, a target distance between the target first pose key point set and the second pose key point set according to at least one first pose key point in the target first pose key point set and the at least one second pose key point.

In one embodiment, the terminal calculates a direct distance between the at least one first pose key point in the target first pose key point set and the at least one second pose key point in the second pose key point set. For example, the first pose key point is (1.1), and the second pose key point is (3, 3), so that calculation may be performed in the following manner:

$$Dist^2 = (3-1)^2 + (3-1)^2$$

$$= 8$$

That is, Dist is 2.828, and Dist represents the target distance.

205: Use the target first pose key point set as a key point set of the first object in the second image when the target distance is less than the preset threshold.

206: Generate an augmented information image according to the key point set of the first object in the second image.

In one embodiment, when the target distance is less than the preset threshold, the terminal performs, according to key point information of the first object in the second image, superimposition of the first object and a target virtual object by using the AR technology, to generate an augmented information image, and presents the augmented information image on a display interface of the terminal, so that an augmented reality image can be further generated. The augmented reality image includes the second image and the augmented information image.

The AR technology is a technology that integrates real world information and virtual world information "seamlessly", where physical information (visual information, sound, taste, touch, and the like) that is difficult to experience in specific time and space ranges of the real world is simulated and then superimposed by using science and technology such as computer science and technology, and the virtual information is applied to the real world and is perceived by human senses, to achieve sensory experience beyond reality. A real environment and a virtual object are superimposed in real time into a same screen or space to coexist. The AR technology includes technologies such as multimedia, 3D modeling, real-time video display and control, multi-sensor fusion, real-time tracking and registration, and scene fusion.

An AR system has three prominent features: first, integration of a real world and virtual information, second, having real-time activity, and third, adding and positioning a virtual object in a three-dimensional scale space.

However, if the target distance is greater than or equal to the preset threshold, it indicates that the target first pose key point set is not the key point set of the first object in the second image. Steps 201 to 205 need to be performed again on another object to determine that the target first pose key point set is a key point set of which object in the second image. For ease of understanding, how to identify a same object in multi-person interaction scenes and generate corresponding augmented reality information for the object with reference to the augmented reality technology is described below.

Figure 3:
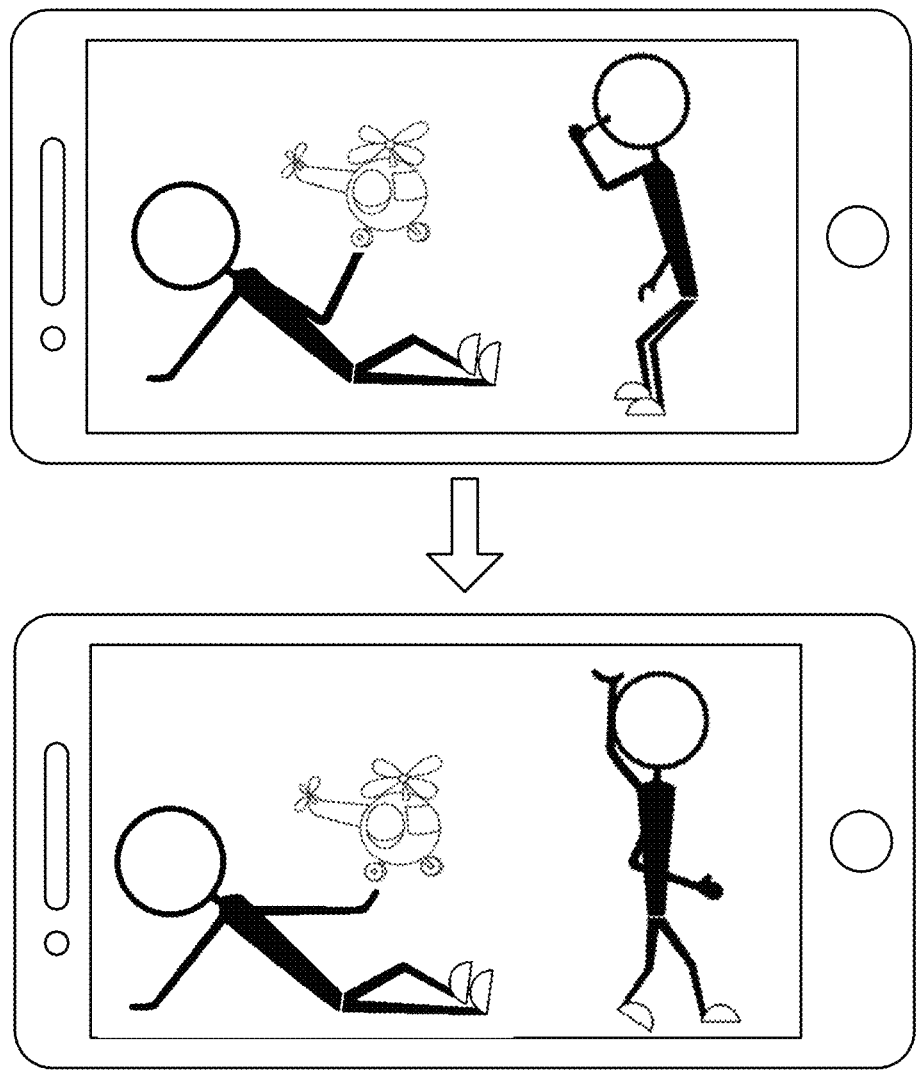
FIG. 3 is a schematic diagram of multi-person interaction pose recognition in an application scenario of the present disclosure.

FIG. 3 is a schematic diagram of multi-person interaction pose recognition in an application scenario of the present disclosure. As shown in FIG. 3, in a first frame of image of a video, two users are live-streaming, that is, a user A on the left and a user B on the right, and a virtual helicopter is placed on a hand of the user A by using the AR technology. In a next frame of image, actions of the user A and the user B change, and in this case, the virtual helicopter still only follows the user A, so that in this frame of image, it can be viewed that a virtual helicopter is placed on a hand of the user A.

Figure 4:
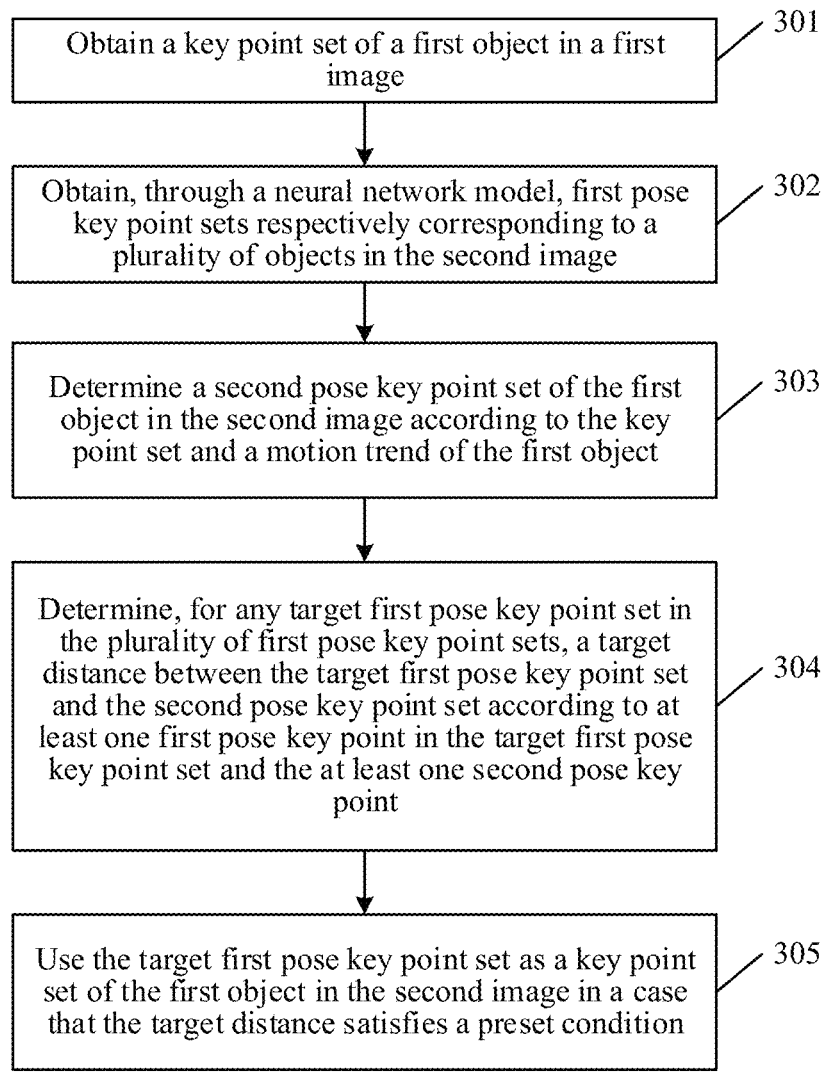
FIG. 4 is a schematic diagram of an object recognition method according to an embodiment of the present disclosure.

The object recognition method in the present disclosure is described below from the perspective of a terminal. Referring to FIG. 4, an object recognition method according to an embodiment of the present disclosure includes the followings.

301: Obtain a key point set of a first object in a first image.

In one embodiment, the terminal is configured to generate an augmented information image for a first object in a plurality of frames of images, the plurality of frames of images includes a first image and a second image, and the second image is a frame of an image immediately following the first image. Specifically, the first object may refer to a person in a multi-person interaction.

Figure 5:
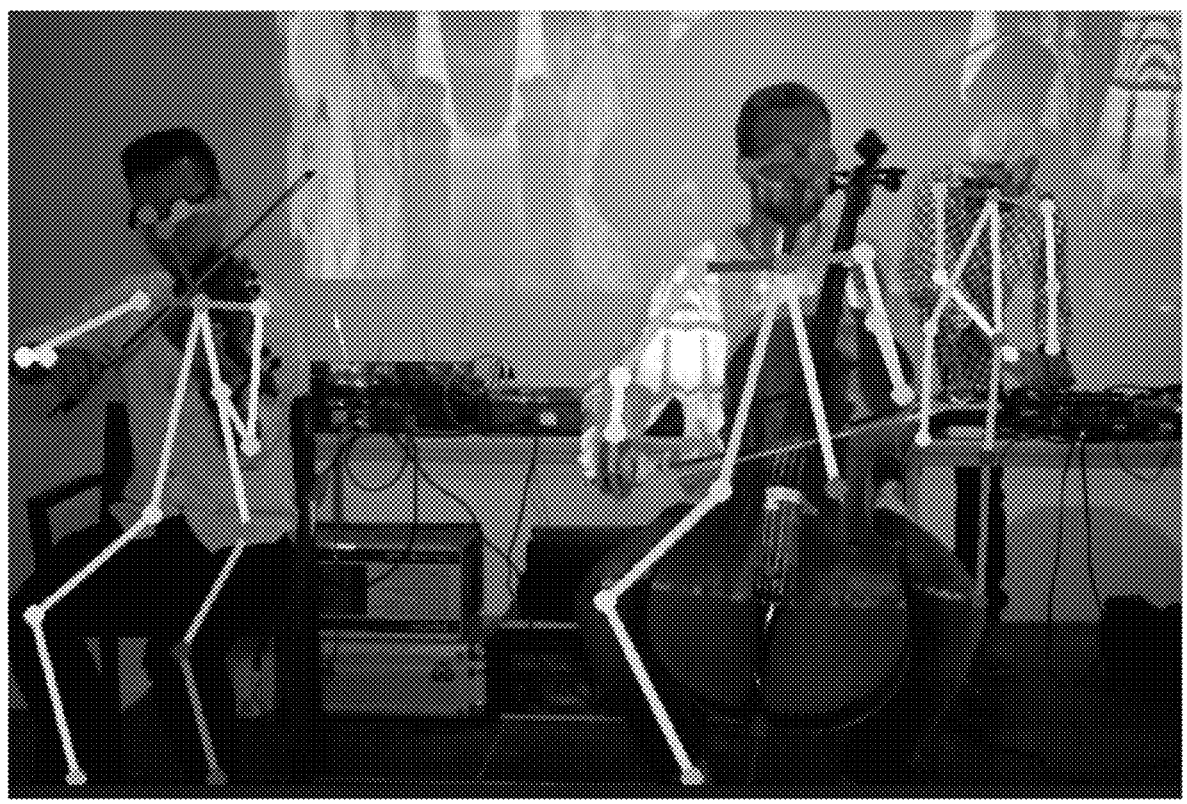
FIG. 5 is a schematic diagram of obtaining a key point set in a single frame of image according to an embodiment of the present disclosure.

For ease of understanding, referring to FIG. 5. FIG. 5 is a schematic diagram of obtaining a key point set in a single frame of image according to an embodiment of the present disclosure. A show in FIG. 5, after a single static image (the first image) is inputted, poses of all persons are outputted. A pose of a person includes N pre-defined key point positions and their corresponding connections. For example, it can be recognized that there are three objects in FIG. 5, and points on each object are key points. Generally, N key points, such as a key point corresponding to the nose, a key point corresponding to the eye, and a key point corresponding to the neck, can be pre-defined.

302: Obtain, through a neural network model, first pose key point sets respectively corresponding to a plurality of objects in the second image, the neural network model being configured to obtain a key point set of an object in an image, and the first pose key point set including at least one first pose key point.

In one embodiment, the terminal obtains, by using a neural network model, first pose key point sets respectively corresponding to a plurality of objects in the second image. The neural network model herein is specifically OpenPose, and in addition, may alternatively be the CPM. The second image is inputted into the neural network model, so that the first pose key point sets respectively corresponding to the plurality of objects in the second image may be outputted.

303: Determine a second pose key point set of the first object in the second image according to the key point set and a motion trend of the first object, the second pose key point set including at least one second pose key point.

In one embodiment, the terminal predicts the key point set in the first image by using at least one of an optical flow algorithm, a Kalman filter algorithm, and a sliding window algorithm, so as to obtain a second pose key point set of the first object in the second image. It should be noted that determining the motion trend of the first object can be referred to the description corresponding to FIG. 2. Details are not repeated herein.

304: Determine, for any target first pose key point set in the plurality of first pose key point sets, a target distance between the target first pose key point set and the second pose key point set according to at least one first pose key point in the target first pose key point set and the at least one second pose key point.

In one embodiment, the terminal calculates a direct distance between the at least one first pose key point in the target first pose key point set and the at least one second pose key point in the second pose key point set. For example, the first pose key point is (1.1), and the second pose key point is (3, 3), so that calculation may be performed in the following manner:

$$Dist^2 = (3-1)^2 + (3-1)^2$$

$$= 8$$

That is, Dist is 2.828, and Dist represents the target distance.

305: Use the target first pose key point set as a key point set of the first object in the second image when the target distance satisfies a preset condition.

In one embodiment, the preset condition is used to determine whether the target first pose key point set is similar to the second pose key point set. When the target distance satisfies the preset condition, it is considered that the target first pose key point set is similar to the second pose key point set. That is, it is considered that the target first pose key point set is the key point set of the first object in the second image, and a currently recognized object is the first object. In one implementation, the preset condition is that the target distance is less than a preset threshold.

When the target distance does not satisfy the preset condition, it is considered that the target first pose key point set is not the key point set of the first object in the second image, and a currently recognized object is not the first object.

It may be understood that, the target distance usually refers to a Euclidean distance or another distance such as a Manhattan distance. This is not limited herein.

In one embodiment of the present disclosure, an object recognition method is provided, the method being applied to a terminal, the terminal being configured to generate an augmented information image for a first object in a plurality of frames of images, the plurality of frames of images including a first image and a second image, and the second image being a frame of an image immediately following the first image. First, the terminal obtains a key point set of the first object in the first image, and then, obtains, through a neural network model, first pose key point sets respectively corresponding to a plurality of objects in the second image. In addition, the terminal also needs to determine a second pose key point set of the first object in the second image according to the key point set and a motion trend of the first object. The second pose key point set can reflect a possible motion pose of the first object in the second image, and may be used as a basis for determining which first pose key point set is the key point set of the first object. Subsequently, the terminal determines, for any target first pose key point set in the plurality of first pose key point sets, a target distance between the target first pose key point set and the second pose key point set according to at least one first pose key point in the target first pose key point set and the at least one second pose key point, and uses the target first pose key point set as a key point set of the first object in the second image when the target distance satisfies a preset condition. Thus, in a multi-person interaction scene, by using the second pose key point set as a basis for determining which first pose key point set is the key point set of the first object, the terminal can recognize key point sets that belong to a same object in a video stream, so that accuracy of recognition is improved.

In one embodiment, a multi-person estimation method generally falls into two categories, namely, a top-down method and a bottom-up method. The top-down method refers to first boxing a person out, where the person is the object. Then, joints of the person are positioned by using a method for a single person. Moreover, the bottom-up method is first determining position of all joints, and then distinguishing which person a joint belongs to. In the present disclosure, an object in a frame of image is recognized mainly in a bottom-up manner.

When the target distance is less than the preset threshold, the terminal considers that the target first pose key point set belongs to the first object, may further perform superimposition of the first object and a target virtual object by using the AR technology, to generate AR information, and presents the AR information on a display interface of the terminal.

Figure 6:
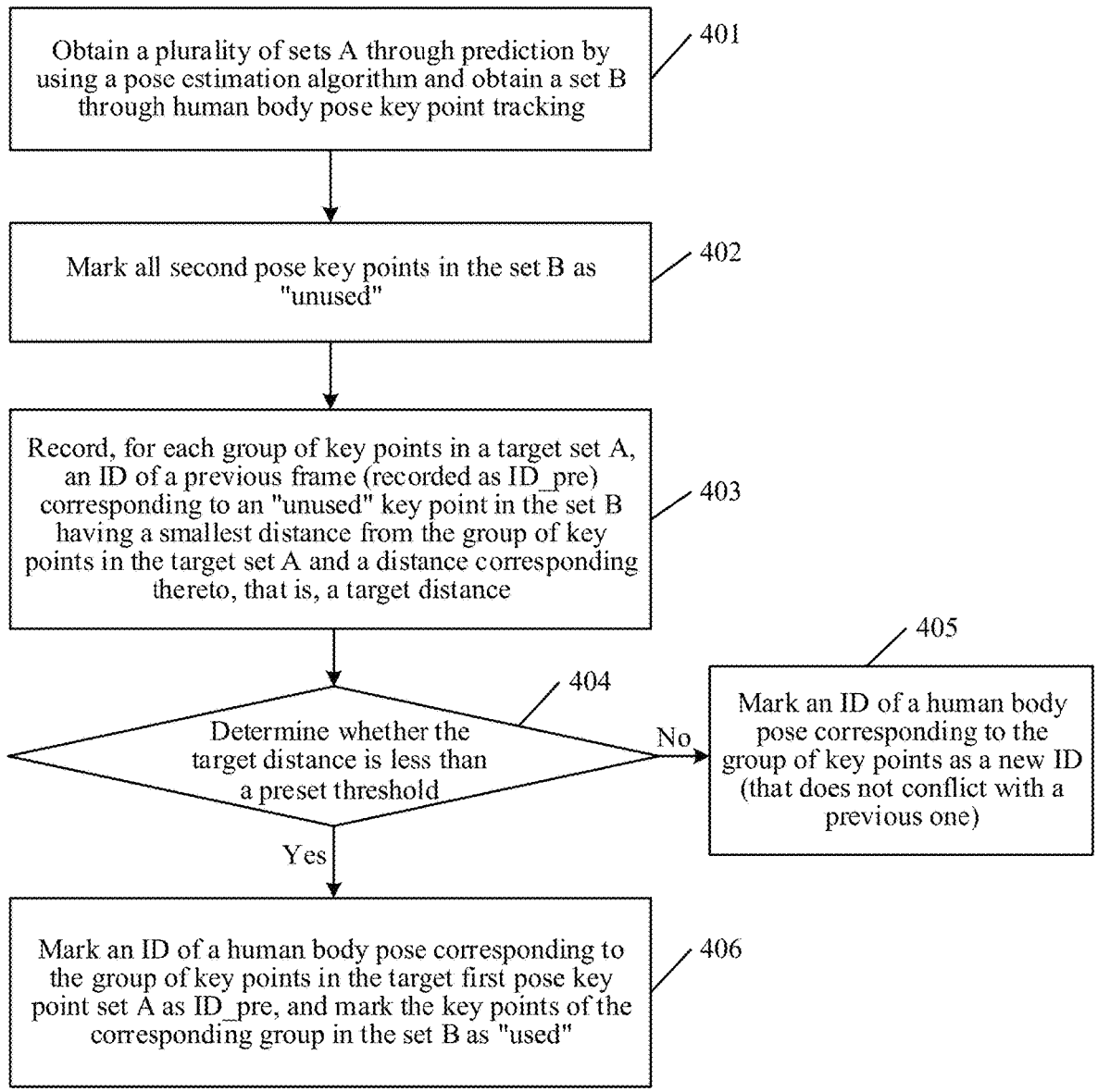
FIG. 6 is a flowchart of recognizing an object according to an embodiment of the present disclosure.

For ease of description, referring to FIG. 6. FIG. 6 is a schematic flowchart of recognizing an object according to an embodiment of the present disclosure. As shown in FIG. 6, the process of recognizing an object includes the followings.

Step 401: A terminal predicts a second image, obtains, by using a pose estimation algorithm, first pose key point sets (recorded as sets A) respectively corresponding to a plurality of objects in the second image, and obtains, by using a human body pose key point tracking algorithm, a second pose key point set (recorded as a set B) of a first object in the second image.

Step 402: The terminal first marks all second pose key points in the set B as "unused".

Step 403: Calculate, for each group of key points in any target set A (a target first pose key point set) in the plurality of sets A, distances between the group of key points and each group of key points in the set B that are marked as "unused", and record, for each group of key points in the target set A, an ID of a previous frame (recorded as ID_pre) corresponding to an "unused" key point in the set B having a smallest distance from the group of key points in the target set A and a distance corresponding thereto, that is, a target distance.

Step 404: Determine whether the target distance is less than a preset threshold, when the target distance is less than the preset threshold, perform step 406, and when the target distance is not less than the preset threshold, perform step 405.

Step 405: When the distance is greater than or equal to the preset threshold, mark an ID of a human body pose corresponding to the group of key points as a new ID (that does not conflict with a previous one).

Step 406: When the distance is less than the preset threshold, consider that a group of key points in the target first pose key point set A successfully matches a group of key points in the set B, so that an ID of a human body pose corresponding to the group of key points in the target first pose key point set A may be marked as the ID (ID_pre) of the corresponding group of key points in the set A, and meanwhile, mark the key points of the corresponding group in the set B as "used".

Second, in one embodiment of the present disclosure, when the target distance is less than the preset threshold, the terminal determines that the target first pose key point set belongs to the first object. In the foregoing manner, in a multi-person interaction scene, the terminal can recognize key point sets of a same object in a video stream, so that accuracy of recognition is improved.

Optionally, the obtaining, through a neural network model, first pose key point sets respectively corresponding to a plurality of objects in the second image may include: obtaining, through the neural network model, heat maps of all key points in the second image, the heat maps including a probability heat map and a vector-based heat map; and obtaining, through the heat maps, the first pose key point sets respectively corresponding to the plurality of objects in the second image.

In one embodiment, first pose key point sets respectively corresponding to a plurality of objects in the second image may be predicted by using a neural network model. Specifically, the neural network model may be OpenPose. A probability heat map and a vector or PAF (part affinity fields) heat map corresponding to all pose key points in the second image are predicted by using OpenPose, and then, all the pose key points are connected by using a post-processing algorithm to form a pose of each person. A detection process is inputting a frame of image, then obtaining a probability heat map and a PAF, and then generating a series of even matches according to the PAF. Due to the vector property of the PAF itself, the generated even matches are correct, and finally are combined into an overall skeleton of a person.

Second, in one embodiment of the present disclosure, the terminal obtains, by using the neural network model, heat maps of all key points in the second image, and then, predicts a first pose key point set by using the heat maps. In the foregoing manner, using a neural network model similar to OpenPose to predict the first pose key point set has relatively good reliability, and an operating speed of such a neural network model is relatively high. That is, even though a relatively large number of objects exist in a same frame of image, difficulty of pose key point set prediction is not increased.

Optionally, the determining a second pose key point set of the first object in the second image according to the key point set and a motion trend of the first object may include: calculating the key point set and a motion trend of the first object by using a preset algorithm, to obtain the second pose key point set of the first object in the second image, the preset algorithm being at least one of an optical flow algorithm, a Kalman filter algorithm, and a sliding window algorithm.

In one embodiment, the terminal may calculate the second pose key point set by using at least one of the optical flow algorithm, the Kalman filter algorithm, and the sliding window algorithm. For example, when the key point set of the first object in the first image includes three key points, namely, (1, 1), (2, 2), and (3, 3), and it is predicted by using the sliding window algorithm that positions of the key point set are a linear change, a position of the key points (1, 1) in the first image is (2, 2) in the second image, a position of the key points (2, 2) in the first image is (3, 3) in the second image, and a position of the key points (3, 3) in the first image is (4, 4) in the second image.

Certainly, in an actual application, the optical flow algorithm and/or the Kalman filter algorithm may alternatively be used.

The optical flow algorithm may be based on the following assumption: a change in grayscale distribution of an image, that is, a pixel change, is caused by motion of a target or a scene, and may reflect the motion trend of the first object. That is, grayscales of the target and the scene do not change over time. Consequently, the optical flow method has a relatively poor noise resistance capability, and its application scope is generally limited by the assumed condition that grayscales of a target and a scene remain unchanged over time.

The Kalman filter algorithm is an algorithm that uses a linear system state to equation to perform optimal estimation on a system state by inputting/outputting observed data by a system. Because the observed data includes impacts of noise and interference in the system, the optimal estimation may alternatively be regarded as a filtering process. The Kalman filter algorithm does not require an assumed condition that both a signal and noise are stationary processes. For a system disturbance and an observation error at each moment, provided that some appropriate assumptions are made on their statistical properties, and an observation signal including noise is processed, an estimate of a real signal having a minimum error can be obtained in an average sense. In terms of image processing, the Kalman filter algorithm is applied to recovering an image that is blurred due to some noise impacts. After consumptions of some statistical properties are made on noise, the Kalman algorithm can be used to recursively obtain a real image having a smallest mean square error from the blurred image, so that the blurred image can be recovered.

Second, in one embodiment of the present disclosure, the key point set and a motion trend of the first object may be calculated by using at least one of an optical flow algorithm, a Kalman filter algorithm, and a sliding window algorithm, to obtain the second pose key point set of the first object in the second image. In the foregoing manner, key point sets of a same object in a plurality of frames of images can be tracked, and a second pose key point set of the object in a next frame of image can be obtained. The optical flow algorithm, the Kalman filter algorithm, and the sliding window algorithm are all algorithms with a small calculation amount, so that key point set tracking efficiency is improved.

Optionally, the determining, for any target first pose key point set in the plurality of first pose key point sets, a target distance between the target first pose key point set and the second pose key point set according to at least one first pose key point in the target first pose key point set and the at least one second pose key point includes: obtaining position information of a first target key point in the at least one first pose key point, and obtaining position information of a second target key point in the at least one second pose key point, the second target key point being a key point having a minimum linear distance to the first target key point; and calculating the target distance according to the position information of the first target key point and the position information of the second target key point.

In one embodiment, the terminal may obtain position information of a first target key point in at least one first pose key point in the target first pose key point set, and obtain position information of a second target key point in at least one second pose key point. It is assumed that the target first pose key point set includes two first pose key points (that is, a point a and a point b), and the second pose key point set includes two second pose key points (that is, a point A and a point B). The point a and the point A are both head key points, and the point b and the point B are both neck key points. First, the terminal selects a shortest path according to a distance between the point a and the point A and a distance between the point b and the point B. For example, when the distance between the point a and the point A is 10, and the distance between the point b and the point B is 20, the target distance is 10.

Further, in one embodiment of the present disclosure, a manner of calculating the target distance by using a minimum value method is provided. That is, a distance between two key points that are closest in two groups of pose key points is calculated, and the distance is the target distance. In the foregoing manner, when the target distance is calculated, only a distance between key points of one group needs to be calculated, and it does not need to perform calculation several times. This is advantageous to improving processing efficiency, and saving computing resources, so that practicability of the solution is improved.

Optionally, the determining, for any target first pose key point set in the plurality of first pose key point sets, a target distance between the target first pose key point set and the second pose key point set according to at least one first pose key point in the target first pose key point set and the at least one second pose key point includes: obtaining position information of one or more first target key points in the at least one first pose key point, and obtaining position information of one or more second target key point in the at least one second pose key point, the one or more first target key points each having a one-to-one correspondence with the one or more second target key points; calculating, according to the position information of the one or more first target key points and the position information of the corresponding one or more second target key points, a minimum distance between each of the one or more first target key points and a second target key point corresponding thereto; and calculating an average value of the at least one minimum distance, to obtain the target distance.

In one embodiment, the terminal may obtain position information of one or more first target key points in at least one first pose key point in the target first pose key point set, and obtain position information of one or more second target key points in at least one second pose key point. It is assumed that the target first pose key point set includes two first pose key points (that is, a point a and a point b), and the second pose key point set includes two second pose key points (that is, a point A and a point B). The point a and the point A are both head key points, and the point b and the point B are both neck key points. First, the terminal calculates a minimum distance between the head key points, that is, a distance between the point a and the point A, where it is assumed that the calculated distance is 10, and then, calculates a minimum distance between the neck key points, that is, a distance between the point b and the point B, where it is assumed that the calculated distance is 20. Therefore, the terminal averages the two distances and obtains by calculation that the target distance is 15.

Second, in one embodiment of the present disclosure, a manner of calculating the target distance by using a minimum value method is provided. That is, key points in a pose key point set and key points in another pose key point set are calculated in a pairwise matching manner, a plurality of minimum distances are obtained, and then, an average of all the minimum distances is obtained, so that the target distance can be determined. In the foregoing manner, in a case of calculating the target distance, using an average value method is more reliable, and therefore, is advantageous to improving feasibility and operability of the solution.

Optionally, the first object and a first object identity have a unique correspondence; and the first object identity is used to identify the first object in the plurality of frames of images.

In one embodiment, different objects may alternatively be identified, and each object only corresponds to a unique identity, and there is no repetitiveness between the identities.

For example, there are four objects, namely, A, B, C, and D, in a first frame of image. In this case, a relationship between each object and a corresponding identity thereof is shown in Table 1.

TABLE 1

| Object | Object identity |
|--------|-----------------|
| A      | ID-1            |
| B      | ID-2            |
| C      | ID-3            |
| D      | ID-4            |

A relationship between an object in a second frame of image and a corresponding identity thereof is shown in Table 2.

TABLE 2

| Object | Object identity |
|--------|-----------------|
| A      | ID-1            |
| B      | ID-2            |
| C      | ID-3            |
| D      | ID-4            |
| E      | ID-5            |
| F      | ID-6            |

It should be noted that when an identity is assigned to an object, identities may be assigned to different objects according to an assignment rule from left to right, or identities may be assigned to different objects according to an assignment rule from a high confidence level to a low confidence level. This is not limited herein.

Second, in one embodiment of the present disclosure, different objects may be identified by using different identities, and whether objects in a plurality of frames of images are same object may be determined by using an identity. Thus, the uniqueness of an object can be directly determined according to an identity, and corresponding processing is performed on the unique object, so that practicability and feasibility of the solution are improved.

Figure 7:
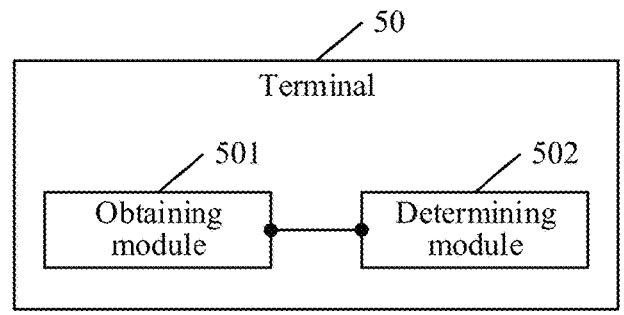
FIG. 7 is a schematic diagram of a terminal according to an embodiment of the present disclosure.

The terminal in the present disclosure is described below in detail. FIG. 7 is a schematic diagram of an embodiment of a terminal according to an embodiment of the present disclosure. The terminal is configured to generate an augmented information image for a first object in a plurality of frames of images, the plurality of frames of images includes a first image and a second image, and the second image is a frame of an image immediately following the first image. As shown in FIG. 7, terminal 50 includes an obtaining module 501 and a determining module 502, etc.

The obtaining module 501 is configured to obtain a key point set of the first object in the first image. Specifically, the obtaining module 501 is configured to obtain, through a neural network model, first pose key point sets respectively corresponding to a plurality of objects in the second image. The neural network model is configured to obtain a key point set of an object in an image, and the first pose key point set including at least one first pose key point.

Further, the obtaining module 501 is configured to determine a second pose key point set of the first object in the second image according to the key point set and a motion trend of the first object, the second pose key point set including at least one second pose key point.

The determining module 502 is configured to determine, for any target first pose key point set in the plurality of first pose key point sets, a target distance between the target first pose key point set and the second pose key point set according to at least one first pose key point in the target first pose key point set and the at least one second pose key point obtained by the obtaining module 501.

Further, the determining module 502 is configured to use the target first pose key point set as a key point set of the first object in the second image when the target distance satisfies a preset condition.

In one embodiment, the obtaining module 501 obtains a key point set of the first object in the first image, the obtaining module 501 obtains, through a neural network model, first pose key point sets respectively corresponding to a plurality of objects in the second image, the obtaining module 501 determines a second pose key point set of the first object in the second image according to the key point set and a motion trend of the first object, the determining module 502 determines, for any target first pose key point set in the plurality of first pose key point sets, a target distance between the target first pose key point set and the second pose key point set according to at least one first pose key point in the target first pose key point set and at least one second pose key point in the second pose key point set obtained by the obtaining module 501, and the determining module 502 uses the target first pose key point set as a key point set of the first object in the second image.

One embodiment of the present disclosure provides a terminal. First, the terminal obtains a key point set of the first object in the first image, and then, obtains, through a neural network model, first pose key point sets respectively corresponding to a plurality of objects in the second image. In addition, the terminal also needs to determine a second pose key point set of the first object in the second image according to the key point set and a motion trend of the first object. The second pose key point set can reflect a possible motion pose of the first object in the second image, and may be used as a basis for determining which first pose key point set is the key point set of the first object. Subsequently, the terminal determines, for any target first pose key point set in the plurality of first pose key point sets, a target distance between the target first pose key point set and the second pose key point set according to at least one first pose key point in the target first pose key point set and the at least one second pose key point, and uses the target first pose key point set as a key point set of the first object in the second image when the target distance satisfies a preset condition. Thus, in a multi-person interaction scene, by using the second pose key point set as a basis for determining which first pose key point set is the key point set of the first object, the terminal can recognize key point sets that belong to a same object in a video stream, so that accuracy of recognition is improved. In certain embodiments, the preset condition is that the target distance is less than a preset threshold.

In one embodiment of the present disclosure, when the target distance is less than the preset threshold, the terminal determines that the target first pose key point set belongs to the first object. Thus, in a multi-person interaction scene, the terminal can recognize key point sets of a same object in a video stream, so that the recognition accuracy is improved.

Optionally, in another embodiment of the terminal 50 provided in one embodiment of the present disclosure, the obtaining module 501 is specifically configured to obtain, through the neural network model, heat maps of all key points in the second image, the heat maps including a probability heat map and a vector heat map; and obtain, through the heat maps, the first pose key point sets respectively corresponding to the plurality of objects in the second image.

Second, in one embodiment of the present disclosure, the terminal obtains, by using the neural network model, heat maps of all key points in the second image, and then, predicts first pose key point sets respectively corresponding to the plurality of objects in the second image by using the heat maps. Thus, using a neural network model similar to OpenPose to predict the first pose key point set has relatively good reliability, and an operating speed of such a neural network model is relatively high. That is, even though a relatively large number of objects exist in a same frame of image, difficulty of pose key point set prediction is not increased.

Optionally, in another embodiment of the terminal 50 provided in one embodiment of the present disclosure, the obtaining module 501 is specifically configured to calculate the key point set and a motion trend of the first object by using a preset algorithm, to obtain the second pose key point set, the preset algorithm being at least one of an optical flow algorithm, a Kalman filter algorithm, and a sliding window algorithm.

Second, in one embodiment of the present disclosure, the key point set and a motion trend of the first object may be calculated by using at least one of an optical flow algorithm, a Kalman filter algorithm, and a sliding window algorithm, to obtain the second pose key point set of the first object in the second image. Thus, key point sets of a specific object in a plurality of frames of images can be tracked, and a second pose key point set of the object in a next frame of image can be obtained. The optical flow algorithm, the Kalman filter algorithm, and the sliding window algorithm are all algorithms with a small calculation amount, so that key point set tracking efficiency is improved.

Optionally, in another embodiment of the terminal 50 provided in one embodiment of the present disclosure, the determining module 502 is specifically configured to obtain position information of a first target key point in the at least one first pose key point, and obtain position information of a second target key point in the at least one second pose key point, the second target key point being a key point having a minimum linear distance to the first target key point; and calculate the target distance according to the position information of the first target key point and the position information of the second target key point.

Further, in one embodiment of the present disclosure, a manner of calculating the target distance by using a minimum value method is provided. That is, a distance between two key points that are closest in two groups of pose key points is calculated, and the distance is the target distance. Thus, when the target distance is calculated, only a distance between key points of one group needs to be calculated, and it does not need to perform calculation several times. This is advantageous to improving processing efficiency, and saving computing resources, so that practicability of the solution is improved.

Optionally, in another embodiment of the terminal 50 provided in one embodiment of the present disclosure, the determining module 502 is specifically configured to obtain position information of one or more first target key points in the at least one first pose key point, and obtain position information of one or more second target key point in the at least one second pose key point, the one or more first target key points each having a one-to-one correspondence with the one or more second target key points; calculate, according to the position information of the one or more first target key points and the position information of the corresponding one or more second target key points, a minimum distance between each of the one or more first target key points and a second target key point corresponding thereto; and calculate an average value of the at least one minimum distance, to obtain the target distance.

Second, in one embodiment of the present disclosure, a manner of calculating the target distance by using a minimum value method is provided. That is, key points in a pose key point set and key points in another pose key point set are calculated in a pairwise matching manner, a plurality of minimum distances are obtained, and then, an average of all the minimum distances is obtained, so that the target distance can be determined. Thus, in a case of calculating the target distance, using an average value method is more reliable, and therefore, is advantageous to improving feasibility and operability of the solution.

Optionally, in another embodiment of the terminal 50 provided in one embodiment of the present disclosure, the first object and a first object identity have a unique correspondence; and the first object identity is used to identify the first object in the plurality of frames of images.

Second, in one embodiment of the present disclosure, different objects may be identified by using different identities, and whether objects in a plurality of frames of images are same object may be determined by using an identity. Thus, uniqueness of an object can be directly determined according to an identity, and corresponding processing is performed on the unique object, so that practicability and feasibility of the solution are improved.

Figure 8:
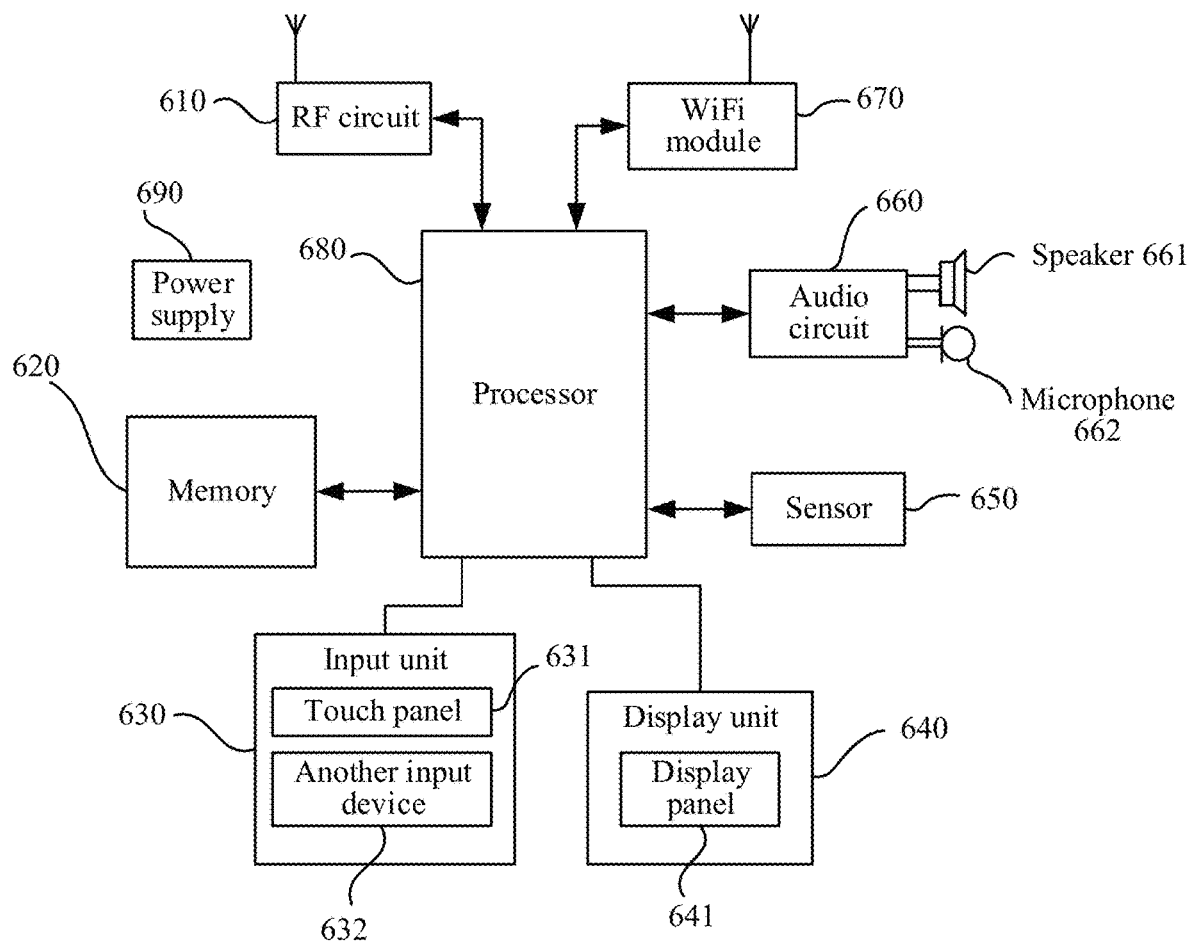
FIG. 8 is a structural diagram of a terminal according to an embodiment of the present disclosure.

One embodiment of the present disclosure further provides another terminal, as shown in FIG. 8, and for convenience of description, only parts related to one embodiment of the present disclosure relevant are shown. For specific technical details that are not disclosed, refer to the method part of the embodiments of the present disclosure. The terminal may be any terminal device including a mobile phone, a tablet computer, a Personal Digital Assistant (PDA), a Point of Sales (POS), and an on-board computer, and the terminal being a mobile phone is used as an example.

FIG. 8 is a block diagram of a structure of a part of a mobile phone related to a terminal according to an embodiment of the present disclosure. Referring to FIG. 8, the mobile phone includes components such as a radio frequency (RF) circuit 610, a memory 620, an input unit 630, a display unit 640, a sensor 650, an audio circuit 660, a wireless fidelity (WiFi) module 670, a processor 680, and a power supply 690. A person skilled in the art may understand that the structure of the mobile phone shown in FIG. 8 does not constitute a limitation to the mobile phone, and the mobile phone may include more components or fewer components than those shown in the figure, or some components may be combined, or a different component deployment may be used.

The RF circuit 610 may be configured to receive and send a signal during an information receiving and sending process or a call process. Specifically, the RF circuit receives downlink information from a base station, then delivers the downlink information to the processor 680 for processing, and sends related uplink data to the base station. Generally, the RF circuit 610 includes, but is not limited to, an antenna, at least one amplifier, a transceiver, a coupler, a low noise amplifier (LNA), and a duplexer. In addition, the RF circuit 610 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 620 may be configured to store a software program and module. The processor 680 runs the software program and module stored in the memory 620, to implement various functional applications and data processing of the mobile phone. The memory 620 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 620 may include a high speed random access memory, and may further include a non-volatile memory, such as at least one magnetic disk storage device, a flash memory, or other volatile solid-state storage devices.

The input unit 630 may be configured to receive inputted digit or character information, and generate a keyboard signal inputted related to the user setting and function control of the mobile phone. Specifically, the input unit 630 may include a touch panel 631 and another input device 632. The touch panel 631, which may also be referred to as a touch screen, may collect a touch operation of a user on or near the touch panel (such as an operation of a user on or near the touch panel 631 by using any suitable object or accessory such as a finger or a stylus), and drive a corresponding connection apparatus according to a preset program. Optionally, the touch panel 631 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 680. Moreover, the touch controller can receive and execute a command sent by the processor 680. In addition, the touch panel 631 may be a resistive, capacitive, infrared, or surface sound wave type touch panel. In addition to the touch panel 631, the input unit 630 may further include the another input device 632. Specifically, the another input device 632 may include, but is not limited to: one or more of a physical keyboard, a functional key (such as a volume control key or a switch key), a track ball, a mouse, and a joystick.

The display unit 640 may be configured to display information input by the user or information provided for the user, and various menus of the mobile phone. The display unit 640 may include a display panel 641. Optionally, the display panel 641 may be configured by using a liquid crystal display (LCD), an organic light-emitting diode (OLED), or the like. Further, the touch panel 631 may cover the display panel 641. After detecting a touch operation on or near the touch panel 631, the touch panel 531 transfers the touch operation to the processor 680, so as to determine a type of a touch event. Then, the processor 680 provides corresponding visual output on the display panel 641 according to the type of the touch event. Although, in FIG. 8, the touch panel 631 and the display panel 641 are used as two separate parts to implement input and output functions of the mobile phone, in some embodiments, the touch panel 631 and the display panel 641 may be integrated to implement the input and output functions of the mobile phone.

The mobile phone may further include at least one sensor 650 such as an optical sensor, a motion sensor, and other sensors. Specifically, the optical sensor may include an ambient light sensor and a proximity sensor. The ambient light sensor may adjust luminance of the display panel 641 according to brightness of the ambient light. The proximity sensor may switch off the display panel 641 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the pose of the mobile phone (for example, switching between landscape orientation and portrait orientation, a related game, and magnetometer pose calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 660, a speaker 661, and a microphone 662 may provide audio interfaces between the user and the mobile phone. The audio circuit 660 may convert received audio data into an electric signal and transmit the electric signal to the speaker 661. The speaker 661 converts the electric signal into a sound signal for output. On the other hand, the microphone 662 converts a collected sound signal into an electric signal. The audio circuit 660 receives the electric signal and converts the electric signal into audio data, and outputs the audio data to the processor 680 for processing. Then, the processor 680 sends the audio data to, for example, another mobile phone by using the RF circuit 610, or outputs the audio data to the memory 620 for further processing.

WiFi is a short distance wireless transmission technology. The mobile phone may help, by using the WiFi module 670, the user to receive and send e-mails, browse a web page, access streaming media, and so on, which provides wireless broadband Internet access for the user. Although FIG. 8 shows the WiFi module 670, it may be understood that the WiFi module 670 is not a necessary component of the mobile phone, and when required, the WiFi module 670 may be omitted provided that the scope of the essence of the present disclosure is not changed.

The processor 680 is the control center of the mobile phone, and is connected to various parts of the mobile phone by using various interfaces and lines. By running or executing the software program and/or module stored in the memory 620, and invoking data stored in the memory 620, the processor 680 performs various functions and data processing of the mobile phone, thereby performing overall monitoring on the mobile phone. Optionally, the processor 680 may include one or more processing units. Optionally, the processor 680 may integrate an application processor and a modem. The application processor mainly processes an operating system, a user interface, an application program, and the like. The modem mainly processes wireless communication. It may be understood that the foregoing modem processor may alternatively not be integrated into the processor 680.

The mobile phone further includes the power supply 690 (such as a battery) for supplying power to the components. Optionally, the power supply may be logically connected to the processor 680 by using a power management system, thereby implementing functions such as charging, discharging and power consumption management by using the power management system.

Although not shown in the figure, the mobile phone may further include a camera, a Bluetooth module, and the like, which are not further described herein.

In one embodiment of the present disclosure, the processor 680 included in the terminal further has the following functions: obtaining a key point set of the first object in the first image; obtaining, through a neural network model, first pose key point sets respectively corresponding to a plurality of objects in the second image, the neural network model being configured to obtain a key point set of an object in an image, and the first pose key point set including at least one first pose key point; determining a second pose key point set of the first object in the second image according to the key point set and a motion trend of the first object, the second pose key point set including at least one second pose key point; determining, for any target first pose key point set in the plurality of first pose key point sets, a target distance between the target first pose key point set and the second pose key point set according to at least one first pose key point in the target first pose key point set and the at least one second pose key point; using the target first pose key point set as a key point set of the first object in the second image when the target distance is less than the preset threshold; and generating an augmented information image according to the key point set of the first object in the second image.

Optionally, the processor 680 is further configured to perform: obtaining a key point set of the first object in the first image; obtaining, through a neural network model, first pose key point sets respectively corresponding to a plurality of objects in the second image, the neural network model being configured to obtain a key point set of an object in an image, and the first pose key point set including at least one first pose key point; determining a second pose key point set of the first object in the second image according to the key point set and a motion trend of the first object, the second pose key point set including at least one second pose key point; determining, for any target first pose key point set in the plurality of first pose key point sets, a target distance between the target first pose key point set and the second pose key point set according to at least one first pose key point in the target first pose key point set and the at least one second pose key point; and using the target first pose key point set as a key point set of the first object in the second image when the target distance satisfies a preset condition.

Optionally, the preset condition is that the target distance is less than a preset threshold.

Optionally, the processor 680 is specifically configured to perform: obtaining, through the neural network model, heat maps of all key points in the second image, the heat maps including a probability heat map and a vector-based heat map; and obtaining, through the heat maps, the first pose key point sets respectively corresponding to the plurality of objects in the second image.

Optionally, the processor 680 is specifically configured to perform: calculating the key point set and a motion trend of the first object by using a preset algorithm, to obtain the second pose key point set, the preset algorithm being at least one of an optical flow algorithm, a Kalman filter algorithm, and a sliding window algorithm.

Optionally, the process of determining the motion trend of the first object includes: determining the motion trend of the first object according to the first image.

Optionally, the process of determining the motion trend of the first object includes: determining the motion trend of the first object according to a pixel change between the first image and the second image.

Optionally, the processor 680 is specifically configured to perform: obtaining position information of a first target key point in the at least one first pose key point, and obtaining position information of a second target key point in the at least one second pose key point, the second target key point being a key point having a minimum linear distance to the first target key point; and calculating the target distance according to the position information of the first target key point and the position information of the second target key point.

Optionally, the processor 680 is specifically configured to perform: obtaining position information of one or more first target key points in the at least one first pose key point, and obtaining position information of one or more second target key point in the at least one second pose key point, the one or more first target key points each having a one-to-one correspondence with the one or more second target key points; calculating, according to the position information of the one or more first target key points and the position information of the corresponding one or more second target key points, a minimum distance between each of the one or more first target key points and a second target key point corresponding thereto; and calculating an average value of the at least one minimum distance, to obtain the target distance.

An embodiment of the present disclosure further provides a computer program product, including instructions, in a case of being run on a computer, the instructions causing the computer to perform the augmented reality processing method or object recognition method according to any one of the foregoing embodiments.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present disclosure, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. An augmented reality processing method for a terminal, comprising:
   obtaining a plurality of frames of images, the plurality of frames of images comprising a first image and a second image, the second image being a frame of an image immediately following the first image;
   obtaining a key point set of a first object in the first image;
   obtaining, through a neural network model, first pose key point sets respectively corresponding to a plurality of objects in the second image, the neural network model being configured to obtain a key point set of an object in an image, and the first pose key point set comprising at least one first pose key point;

determining a second pose key point set of the first object in the second image according to the key point set and a motion trend of the first object, the second pose key point set comprising at least one second pose key point;

determining, for any target first pose key point set in the plurality of first pose key point sets, a target distance between the target first pose key point set and the second pose key point set according to at least one first pose key point in the target first pose key point set and the at least one second pose key point;

using the target first pose key point set as a key point set of the first object in the second image when the target distance is less than a preset threshold; and generating an augmented information image according to the key point set of the first object in the second image.

2. The method according to claim 1, further comprising:
generating an augmented reality image, the augmented reality image comprising the second image and the augmented information image.

3. The method according to claim 1, wherein the determining the motion trend of the first object comprises:
determining the motion trend of the first object according to the first image.

4. The method according to claim 1, wherein the determining the motion trend of the first object comprises:
determining the motion trend of the first object according to a pixel change between the first image and the second image.

5. An object recognition method for a terminal, comprising:
obtaining a plurality of frames of images, the plurality of frames of images comprising a first image and a second image, the second image being a frame of an image immediately following the first image;

obtaining a key point set of the first object in the first image;

obtaining, through a neural network model, first pose key point sets respectively corresponding to a plurality of objects in the second image, the neural network model being configured to obtain a key point set of an object in an image, and the first pose key point set comprising at least one first pose key point;

determining a second pose key point set of the first object in the second image according to the key point set and a motion trend of the first object, the second pose key point set comprising at least one second pose key point;

for any target first pose key point set in the plurality of first pose key point sets, determining a target distance between the target first pose key point set and the second pose key point set according to at least one first pose key point in the target first pose key point set and the at least one second pose key point; and using the target first pose key point set as a key point set of the first object in the second image when the target distance satisfies a preset condition.

6. The method according to claim 5, wherein
the preset condition is that the target distance is less than a preset threshold.

7. The method according to claim 5, wherein the obtaining, through a neural network model, first pose key point sets respectively corresponding to a plurality of objects in the second image comprises:

obtaining, through the neural network model, heat maps of all key points in the second image, the heat maps comprising a probability heat map and a vector heat map; and obtaining, through the heat maps, the first pose key point sets respectively corresponding to the plurality of objects in the second image.

8. The method according to claim 5, wherein the determining a second pose key point set of the first object in the second image according to the key point set and a motion trend of the first object comprises:

calculating the key point set and a motion trend of the first object by using a preset algorithm, to obtain the second pose key point set, the preset algorithm being at least one of an optical flow algorithm, a Kalman filter algorithm, and a sliding window algorithm.

9. The method according to claim 5, wherein the determining the motion trend of the first object comprises:
determining the motion trend of the first object according to the first image.

10. The method according to claim 5, wherein the determining the motion trend of the first object comprises:
determining the motion trend of the first object according to a pixel change between the first image and the second image.

11. The method according to claim 5, wherein the determining, for any target first pose key point set in the plurality of first pose key point sets, a target distance between the target first pose key point set and the second pose key point set according to at least one first pose key point in the target first pose key point set and the at least one second pose key point comprises:

obtaining position information of a first target key point in the at least one first pose key point, and obtaining position information of a second target key point in the at least one second pose key point, the second target key point being a key point having a minimum linear distance to the first target key point; and calculating the target distance according to the position information of the first target key point and the position information of the second target key point.

12. The method according to claim 5, wherein the determining, for any target first pose key point set in the plurality of first pose key point sets, a target distance between the target first pose key point set and the second pose key point set according to at least one first pose key point in the target first pose key point set and the at least one second pose key point comprises:

obtaining position information of one or more first target key points in the at least one first pose key point, and obtaining position information of one or more second target key point in the at least one second pose key point, the one or more first target key points each having a one-to-one correspondence with the one or more second target key points;

calculating, according to the position information of the one or more first target key points and the position information of the corresponding one or more second target key points, a minimum distance between each of the one or more first target key points and a second target key point corresponding thereto; and calculating an average value of the at least one minimum distance, to obtain the target distance.

13. The method according to claim 5, wherein
the first object and a first object identity have a unique correspondence; and the first object identity is used to identify the first object in the plurality of frames of images.

14. A terminal, comprising:
a memory configured to store a program;
a processor; and
a bus system configured to connect the memory and the processor, to enable the memory and the processor to communicate with each other,
wherein the processor is configured to execute the program in the memory to perform:
obtaining a plurality of frames of images, the plurality of frames of images comprising a first image and a second image, the second image being a frame of an image immediately following the first image;
obtaining a key point set of a first object in the first image;
obtaining, through a neural network model, first pose key point sets respectively corresponding to a plurality of objects in the second image, the neural network model being configured to obtain a key point set of an object in an image, and the first pose key point set comprising at least one first pose key point;
determining a second pose key point set of the first object in the second image according to the key point set and a motion trend of the first object, the second pose key point set comprising at least one second pose key point;
determining, for any target first pose key point set in the plurality of first pose key point sets, a target distance between the target first pose key point set and the second pose key point set according to at least one first pose key point in the target first pose key point set and the at least one second pose key point;
using the target first pose key point set as a key point set of the first object in the second image when the target distance satisfies a preset condition; and
generating an augmented information image according to the key point set of the first object in the second image.

15. The terminal according to claim 14, wherein the processor is further configured to perform:
generating an augmented reality image, the augmented reality image comprising the second image and the augmented information image.

16. The terminal according to claim 14, wherein the determining the motion trend of the first object comprises:
determining the motion trend of the first object according to the first image.

17. The terminal according to claim 14, wherein the determining the motion trend of the first object comprises:
determining the motion trend of the first object according to a pixel change between the first image and the second image.

* * * * *